United States Patent
George et al.

(10) Patent No.: US 10,855,783 B2
(45) Date of Patent: Dec. 1, 2020

(54) COMMUNICATION NOTIFICATION TRIGGER MODELING PREVIEW

(71) Applicant: Adobe Inc., San Jose, CA (US)

(72) Inventors: William Brandon George, Pleasant Grove, UT (US); Nathan Purser, Highland, UT (US); Joseph Ward, Provo, UT (US); Kristopher Paries, Murray, UT (US); John Bates, Highland, UT (US)

(73) Assignee: Adobe Inc., San Jose, CA (US)

( * ) Notice: Subject to any disclaimer, the term of this patent is extended or adjusted under 35 U.S.C. 154(b) by 98 days.

(21) Appl. No.: 15/412,580

(22) Filed: Jan. 23, 2017

(65) Prior Publication Data
US 2018/0213044 A1    Jul. 26, 2018

(51) Int. Cl.
*H04L 29/08*    (2006.01)
*G08B 21/18*    (2006.01)
*H04L 12/26*    (2006.01)

(52) U.S. Cl.
CPC ............ *H04L 67/22* (2013.01); *G08B 21/182* (2013.01); *H04L 43/16* (2013.01); *H04L 67/26* (2013.01); *H04L 67/2842* (2013.01)

(58) Field of Classification Search
CPC ..... H04L 67/22; H04L 43/16; H04L 63/1425; H04L 67/12; H04L 43/045; H04L 63/1416; G08B 21/182; G06F 17/30554; G06F 17/30539; G06F 17/30303; G06F 17/30392; G06F 17/30477; G06F 17/30516; G06F 17/30563; G06F 21/552; G06F 21/554; G06N 5/025; G06N 99/005; G06Q 30/0207; G06Q 40/00; G06Q 40/04; G06Q 40/06; G06Q 50/22; G06Q 50/24
See application file for complete search history.

(56) References Cited

U.S. PATENT DOCUMENTS

| | | | | |
|---|---|---|---|---|
| 6,041,332 A | * | 3/2000 | Miller | ........................ G06F 8/70 |
| 6,067,288 A | * | 5/2000 | Miller | ................. H04L 41/5003 370/242 |
| 6,069,875 A | * | 5/2000 | Miller | ................... H04L 43/022 370/244 |
| 6,097,702 A | * | 8/2000 | Miller | ................. H04L 41/5009 370/244 |

(Continued)

*Primary Examiner* — Greg C Bengzon
(74) *Attorney, Agent, or Firm* — Kilpatrick Townsend & Stockton LLP

(57) ABSTRACT

In some embodiments, a real-time and interactive preview of alerts is provided in a user interface. A computer system parses a set of rules that specifies an alert definition. Each rule identifies a set of observations and an alert trigger criterion based on user input in the user interface. For a rule, the computer system accesses historical data corresponding to the set of observations identified by the rule and determines, based on an analysis of the historical data, time points that trigger alerts over a time period according to the rule. The analysis is based on the alert trigger criterion identified by the rule. The computer system aggregates, based on the alert definition, the time points determined for the rule with time points determined for another rule from the set of rules. Further, the computer system generates an alert preview over the time period for presentation at the user interface.

19 Claims, 8 Drawing Sheets

(56) References Cited

U.S. PATENT DOCUMENTS

| | | | | |
|---|---|---|---|---|
| 6,836,800 B1* | 12/2004 | Sweet | G06F 11/0709 | 709/224 |
| 7,219,239 B1* | 5/2007 | Njemanze | H04L 63/0218 | 726/21 |
| 7,283,045 B1* | 10/2007 | Manz | G08B 21/0269 | 340/506 |
| 7,376,969 B1* | 5/2008 | Njemanze | G06F 21/55 | 709/224 |
| 7,461,023 B1* | 12/2008 | Helweg | G06Q 40/00 | 705/35 |
| 8,086,708 B2* | 12/2011 | Breitgand | H04L 41/00 | 709/223 |
| 8,176,527 B1* | 5/2012 | Njemanze | G06Q 10/06 | 709/223 |
| 8,655,307 B1* | 2/2014 | Walker | H04W 52/0212 | 455/405 |
| 8,660,849 B2* | 2/2014 | Gruber | G06F 17/3087 | 704/275 |
| 8,676,956 B1* | 3/2014 | Johnson | H04L 43/0876 | 359/206.1 |
| 8,738,487 B1* | 5/2014 | Schmidt | G06Q 40/04 | 705/35 |
| 9,130,832 B1* | 9/2015 | Boe | G06F 16/24 | |
| 9,146,954 B1* | 9/2015 | Boe | H04L 43/16 | |
| 9,158,811 B1* | 10/2015 | Choudhary | G06F 9/542 | |
| 9,197,657 B2* | 11/2015 | Simske | H04L 63/105 | |
| 9,202,249 B1* | 12/2015 | Cohen | G06F 16/285 | |
| 9,210,056 B1* | 12/2015 | Choudhary | G06F 16/284 | |
| 9,294,361 B1* | 3/2016 | Choudhary | G06F 17/30572 | |
| 9,318,108 B2* | 4/2016 | Gruber | G10L 15/1815 | |
| 9,367,872 B1* | 6/2016 | Visbal | G06F 3/0482 | |
| 9,536,197 B1* | 1/2017 | Penilla | G06N 5/025 | |
| 9,609,010 B2* | 3/2017 | Sipple | H04L 63/1425 | |
| 9,747,351 B2* | 8/2017 | Boe | G06F 16/248 | |
| 9,760,613 B2* | 9/2017 | Choudhary | G06F 9/542 | |
| 9,780,995 B2* | 10/2017 | Petersen | H04L 63/0227 | |
| 9,813,460 B2* | 11/2017 | Barber-Mingo | G06Q 10/06 | |
| 9,838,280 B2* | 12/2017 | Boe | G06F 16/24 | |
| 9,876,856 B2* | 1/2018 | Dorn | G01D 4/002 | |
| 9,955,023 B2* | 4/2018 | Richards | H04L 47/10 | |
| 9,960,970 B2* | 5/2018 | Choudhary | G06F 16/284 | |
| 9,985,863 B2* | 5/2018 | Fletcher | G06F 16/903 | |
| 10,009,391 B1* | 6/2018 | Smith | G06F 16/972 | |
| 10,095,878 B2* | 10/2018 | Goldfarb | H04L 41/069 | |
| 2003/0040955 A1* | 2/2003 | Anaya | G06Q 10/0637 | 705/7.36 |
| 2003/0055768 A1* | 3/2003 | Anaya | G06Q 40/06 | 705/36 R |
| 2003/0065608 A1* | 4/2003 | Cutler | G06Q 40/00 | 705/37 |
| 2003/0101260 A1* | 5/2003 | Dacier | H04L 41/0622 | 709/224 |
| 2003/0108049 A1* | 6/2003 | Marilly | H04L 41/142 | 370/395.21 |
| 2003/0115122 A1* | 6/2003 | Slater | G06Q 10/10 | 705/35 |
| 2003/0131098 A1* | 7/2003 | Huntington | H04L 41/22 | 709/224 |
| 2003/0135382 A1* | 7/2003 | Marejka | G06F 11/0709 | 709/232 |
| 2003/0135612 A1* | 7/2003 | Huntington | H04L 41/0803 | 709/224 |
| 2004/0177053 A1* | 9/2004 | Donoho | G06Q 10/04 | 706/47 |
| 2005/0071643 A1* | 3/2005 | Moghe | G06F 21/316 | 713/182 |
| 2005/0076113 A1* | 4/2005 | Klotz | H04L 41/12 | 709/224 |
| 2005/0257264 A1* | 11/2005 | Stolfo | G06F 21/552 | 726/23 |
| 2005/0262237 A1* | 11/2005 | Fulton | H04L 43/0811 | 709/224 |
| 2005/0265331 A1* | 12/2005 | Stolfo | G06F 21/552 | 370/389 |
| 2006/0294095 A1* | 12/2006 | Berk | G06Q 10/04 | |
| 2007/0027801 A1* | 2/2007 | Botzer | G06Q 10/10 | 705/39 |
| 2007/0050206 A1* | 3/2007 | Whikehart | G06Q 10/04 | 705/2 |
| 2007/0143198 A1* | 6/2007 | Brandes | G06Q 10/04 | 705/36 R |
| 2008/0016412 A1* | 1/2008 | White | G06F 11/3409 | 714/48 |
| 2008/0046536 A1* | 2/2008 | Broda | H04L 67/2842 | 709/217 |
| 2008/0049775 A1* | 2/2008 | Morrill | H04L 41/147 | 370/419 |
| 2008/0077358 A1* | 3/2008 | Marvasti | G06N 99/005 | 702/187 |
| 2008/0243711 A1* | 10/2008 | Aymeloglu | G06Q 40/00 | 705/36 R |
| 2008/0288382 A1* | 11/2008 | Smith | G06Q 40/00 | 705/35 |
| 2009/0181665 A1* | 7/2009 | Sater | H04L 41/5009 | 455/424 |
| 2009/0216558 A1* | 8/2009 | Reisman | G06F 19/328 | 705/3 |
| 2009/0222552 A1* | 9/2009 | Chroscielewski | G06F 11/3438 | 709/224 |
| 2010/0046378 A1* | 2/2010 | Knapp | H04L 41/0604 | 370/242 |
| 2010/0046393 A1* | 2/2010 | Knapp | H04L 41/0609 | 370/253 |
| 2010/0274573 A1* | 10/2010 | Feied | G06Q 50/22 | 705/2 |
| 2011/0004446 A1* | 1/2011 | Dorn | G01D 4/002 | 702/188 |
| 2011/0019566 A1* | 1/2011 | Leemet | H04L 12/14 | 370/252 |
| 2011/0035781 A1* | 2/2011 | Moghe | G06F 21/554 | 726/1 |
| 2011/0126111 A1* | 5/2011 | Gill | G06F 21/55 | 715/736 |
| 2011/0178820 A1* | 7/2011 | Soni | A61B 5/0002 | 705/3 |
| 2011/0196774 A1* | 8/2011 | Scianna | G06Q 40/04 | 705/37 |
| 2011/0280547 A1* | 11/2011 | Fan | G08B 13/196 | 386/239 |
| 2011/0314148 A1* | 12/2011 | Petersen | G06F 11/3476 | 709/224 |
| 2012/0005542 A1* | 1/2012 | Petersen | G06F 11/0709 | 714/48 |
| 2012/0011125 A1* | 1/2012 | Bousamra | A61B 5/0002 | 707/740 |
| 2012/0088989 A1* | 4/2012 | Bousamra | A61B 5/14532 | 600/309 |
| 2012/0089893 A1* | 4/2012 | Bousamra | A61B 5/14532 | 714/807 |
| 2012/0117254 A1* | 5/2012 | Ehrlich | H04L 41/142 | 709/228 |
| 2012/0197896 A1* | 8/2012 | Li | H04L 29/08072 | 707/740 |
| 2012/0216243 A1* | 8/2012 | Gill | G06F 21/55 | 726/1 |
| 2012/0224057 A1* | 9/2012 | Gill | G06F 21/55 | 348/143 |
| 2012/0286953 A1* | 11/2012 | Bousamra | G06F 19/3481 | 340/540 |
| 2012/0289803 A1* | 11/2012 | Weinert | G06F 19/3456 | 600/365 |
| 2013/0054784 A1* | 2/2013 | Yadav | H04L 43/18 | 709/224 |
| 2013/0085765 A1* | 4/2013 | Tuchinda | G06Q 50/22 | 705/2 |
| 2013/0174259 A1* | 7/2013 | Pearcy | H04L 41/0893 | 726/25 |

(56) References Cited

U.S. PATENT DOCUMENTS

| | | | |
|---|---|---|---|
| 2013/0227689 A1* | 8/2013 | Pietrowicz | G01R 1/20 726/23 |
| 2014/0078163 A1* | 3/2014 | Cammert | G06F 11/3471 345/589 |
| 2014/0164609 A1* | 6/2014 | Kay | H04L 63/1416 709/224 |
| 2014/0169196 A1* | 6/2014 | Kay | H04L 43/026 370/252 |
| 2014/0200953 A1* | 7/2014 | Mun | G06Q 10/04 705/7.28 |
| 2014/0297665 A1* | 10/2014 | Stevens | G06F 17/30516 707/754 |
| 2014/0344186 A1* | 11/2014 | Nadler | G06Q 10/067 705/36 R |
| 2015/0195406 A1* | 7/2015 | Dwyer | H04M 3/5175 379/265.07 |
| 2015/0227713 A1* | 8/2015 | Lynn | G06F 16/9535 705/2 |
| 2015/0248476 A1* | 9/2015 | Weissinger | G06F 17/30516 707/737 |
| 2015/0333992 A1* | 11/2015 | Vasseur | H04L 12/4633 370/252 |
| 2015/0379430 A1* | 12/2015 | Dirac | G06N 99/005 706/12 |
| 2016/0012223 A1* | 1/2016 | Srivastava | H04L 51/12 726/23 |
| 2016/0034571 A1* | 2/2016 | Setayesh | G06F 16/353 707/738 |
| 2016/0098037 A1* | 4/2016 | Zornio | G05B 19/41855 700/20 |
| 2016/0103559 A1* | 4/2016 | Maheshwari | G06F 17/30548 715/738 |
| 2016/0103888 A1* | 4/2016 | Fletcher | G06F 17/30477 707/722 |
| 2016/0104076 A1* | 4/2016 | Maheshwari | G06N 99/005 706/12 |
| 2016/0104090 A1* | 4/2016 | Alekseyev | G06Q 10/06393 705/7.39 |
| 2016/0105338 A1* | 4/2016 | Fletcher | H04L 43/16 709/224 |
| 2016/0171511 A1* | 6/2016 | Goel | G06Q 50/01 705/7.29 |
| 2016/0241455 A1* | 8/2016 | Novak | H04W 4/70 |
| 2016/0247234 A1* | 8/2016 | Bendel | G06Q 30/0202 |
| 2016/0294606 A1* | 10/2016 | Puri | H04L 41/0695 |
| 2016/0294964 A1* | 10/2016 | Brune | G06N 99/005 |
| 2016/0364434 A1* | 12/2016 | Spitz | G06F 17/30371 |
| 2016/0364750 A1* | 12/2016 | Malloy | G06Q 30/0248 |
| 2016/0366036 A1* | 12/2016 | Gupta | H04L 67/16 |
| 2016/0373476 A1* | 12/2016 | Dell'Anno | G06F 17/30563 |
| 2017/0006135 A1* | 1/2017 | Siebel | H04L 67/02 |
| 2017/0046127 A1* | 2/2017 | Fletcher | G06F 3/04817 |
| 2017/0048264 A1* | 2/2017 | Chauhan | H04L 63/1425 |
| 2017/0063897 A1* | 3/2017 | Muddu | H04L 43/08 |
| 2017/0093952 A1* | 3/2017 | Kumar | H04L 51/18 |
| 2017/0116416 A1* | 4/2017 | Pearcy | G06F 21/562 |
| 2017/0141969 A1* | 5/2017 | Choudhary | G06F 16/284 |
| 2017/0155558 A1* | 6/2017 | Alekseyev | G06F 16/903 |
| 2017/0171231 A1* | 6/2017 | Reybok, Jr. | H04L 63/14 |
| 2017/0213178 A1* | 7/2017 | Todd | G06Q 10/06398 |
| 2017/0214702 A1* | 7/2017 | Moscovici | H04L 63/1416 |
| 2017/0243119 A1* | 8/2017 | Petersen | H04L 41/069 |
| 2017/0286502 A1* | 10/2017 | Bar-Or | G06F 17/30554 |
| 2017/0286526 A1* | 10/2017 | Bar-Or | G06F 17/30604 |
| 2017/0299633 A1* | 10/2017 | Pietrowicz | H04L 63/0227 |
| 2017/0322985 A1* | 11/2017 | Boe | H04L 43/16 |
| 2017/0323385 A1* | 11/2017 | Sivaramakrishnan | G06Q 40/06 |
| 2017/0329462 A1* | 11/2017 | Maheshwari | G06F 17/30548 |
| 2017/0336768 A1* | 11/2017 | Geffin | G05B 15/02 |
| 2017/0337252 A1* | 11/2017 | Choudhary | G06F 9/542 |
| 2017/0339029 A1* | 11/2017 | Bingham | H04L 41/12 |
| 2017/0351511 A1* | 12/2017 | Bar-Or | G06F 8/34 |
| 2018/0041643 A1* | 2/2018 | Richards | H04L 47/10 |
| 2018/0060742 A1* | 3/2018 | Penilla | G06N 5/025 |
| 2018/0083990 A1* | 3/2018 | Abe | H04L 63/1425 |
| 2018/0084011 A1* | 3/2018 | Joseph | H04L 63/1416 |
| 2018/0096105 A1* | 4/2018 | Bleicher | G06Q 10/10 |
| 2018/0173769 A1* | 6/2018 | Saperstein | H04L 63/1416 |
| 2018/0213046 A1* | 7/2018 | Cherdabayev | G06Q 10/10 |
| 2018/0309807 A1* | 10/2018 | Smith | G06F 16/2423 |
| 2019/0163851 A1* | 5/2019 | Poston | H04L 41/12 |
| 2019/0166145 A1* | 5/2019 | Chauhan | G06F 21/577 |
| 2019/0173893 A1* | 6/2019 | Muddu | G06F 16/24578 |
| 2019/0303385 A1* | 10/2019 | Ching | H04L 63/1433 |

\* cited by examiner

FIG. 3

COMMUNICATION NOTIFICATION TRIGGER MODELING PREVIEW

TECHNICAL FIELD

The application relates to a real-time, interactive preview of alerts, where the alerts are triggered based on an analysis of a large amount of data and represents anomalies or changes in the data.

BACKGROUND

Large-scale data processing involves extracting and processing data of interest from raw data in data sets to generate a desired output. The data sets can get large, frequently gigabytes to terabytes in size and be distributed across multiple sources. An important application of the processing is the detection of anomalies or changes in the data. If detected, enterprises can initiate corrective actions.

To illustrate, consider the example of monitoring traffic to a web site. A certain range of traffic volume may be expected on a daily basis. Computing resources to host the web site are sized and committed to host the web site based on this range. Page views are monitored and analyzed. The total number of page views indicates the traffic volume. The difference between the total number of page views and the expected traffic volume indicates how well the computing resources are used. For instance, if the total number of page views is larger than the expected traffic volume, insufficient computing resources may have been committed, which may have resulted or could result in latency or a crash of the web site. Hence, it is beneficial for an administrator of the web site to gain real-time knowledge about the difference between actual and expected traffic volumes and dynamically commit computational resources accordingly.

Existing systems generally implement an alert mechanism for alerting system administrators or other users about detected anomalies or changes. The alert mechanism provides the relevant real-time knowledge, thereby enabling the initiation of the proper corrective actions. However, the alert mechanism of existing systems suffer from various drawbacks, especially when the size of the data becomes large. Typically, the alert mechanism is implemented on a trial and error basis. Under this approach, the alert mechanism is first deployed and a user then subscribes to it directly or by referral. Data is analyzed and alerts are generated and sent to a device of the user. As the size of the data increases, the number and frequency of alerts also increase. Similarly, velocity in the data (e.g., changes) can contribute to an increase in alerts.

Hence, the user may become bombarded with alerts. This phenomenon is known as alert fatigue, where the user receives and tracks a large number of alerts at a high frequency. When alert fatigue occurs, the alerts become akin to SPAM. The user will generally ignore these alerts and may even unsubscribe from the alert mechanism. Because the alerts are treated like SPAM, the usage of alert mechanism becomes sub-optimal. Particularly, the computing resources hosting the alert mechanism are inefficiently used as a large amount of alerts is unnecessarily generated. Further, unnecessary bandwidth is consumed for communicating the alerts, where the bandwidth corresponds to the network between the computing resources and the user device.

SUMMARY

Embodiments of the present disclosure include providing a real-time and interactive preview of alerts in a user interface. In an example, the performance of an alert definition is previewed. The alert definition includes a set of rules and aggregation logic for generating alerts based on anomalies or changes to data of interest. The alert definition is specified based on user input in the user interface. For example, the user input identifies, for each rule, a set of observations and an alert trigger criterion. The aggregation logic indicates how alerts triggered by the different rules should be aggregated. The performance of the alert definition includes the total number, distribution, frequency, and/or recency of triggered alerts over a time period. Adjustments to the alert definition can be made in real-time based on the preview to avoid alert fatigue. Once finalized, the alert definition is saved and subsequently used to analyze the anomalies or changes in the data and, accordingly, trigger and send alerts to subscribed users.

In an example, to preview the performance, the set of rules is parsed. For a rule from the set of rules, historical data corresponding to the set of observations identified by the rule is accessed. Time points are determined for the rule based on an analysis of the historical data. The time points fall within a time period and would trigger alerts during the time period according to the rule. The analysis of the historical data is based on the alert trigger criterion identified by the rule. The time points determined for the rule are aggregated with time points determined for another rule from the set of rules based on the alert definition, such as based on the aggregation logic. An alert preview over the time period is generated for presentation at the user interface in response to the user input. The alert preview presents, among other information, a total number and distribution of all alerts for the alert definition over the time period and a total number of the alerts for the rule over the time period.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 3 illustrates an example of a user interface for specifying an alert definition and presenting a preview of the alert definition's performance, according to certain embodiments.

DETAILED DESCRIPTION

Figure 1:
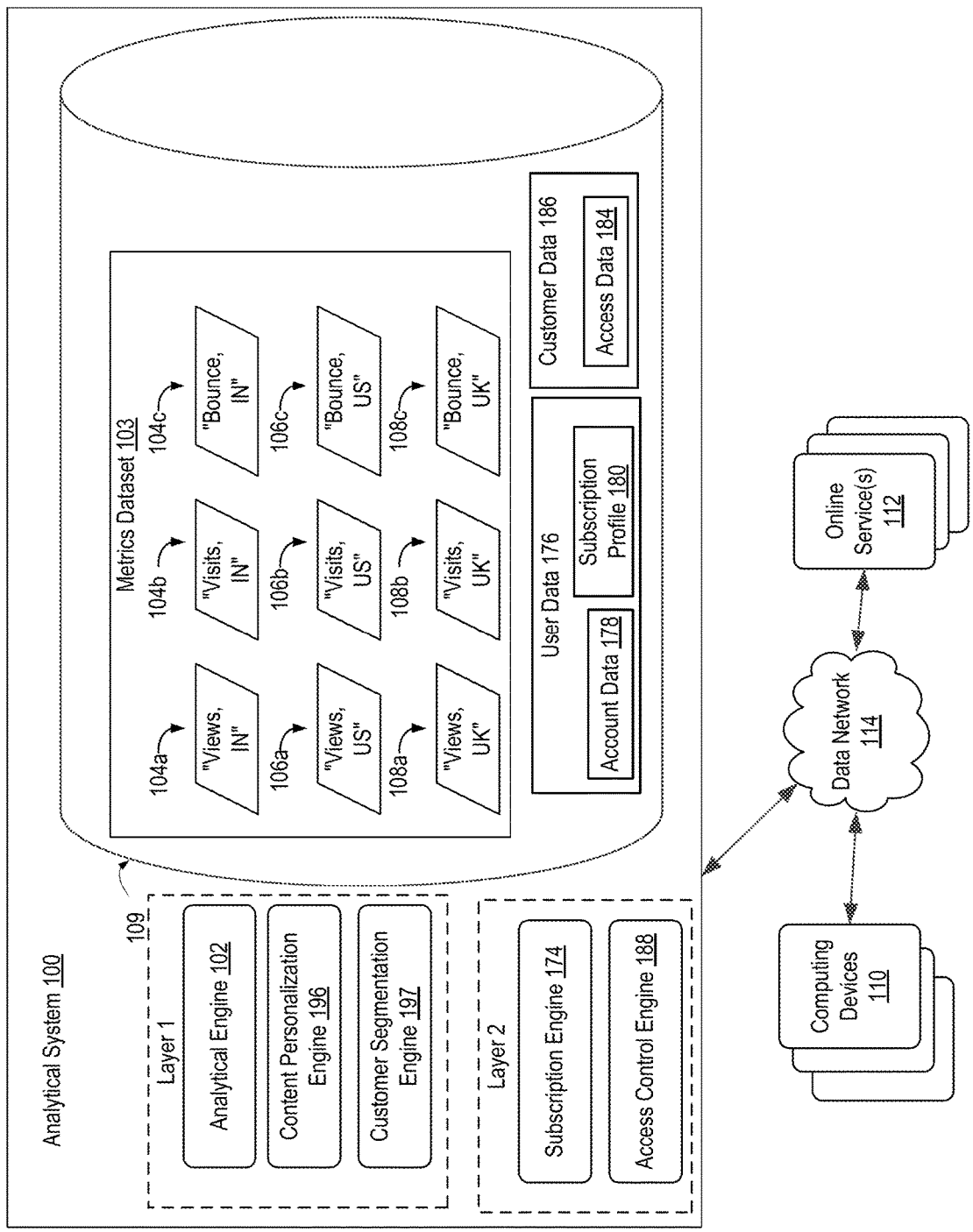
FIG. 1 illustrates an example of a computing environment in which an analytical system is used for detecting anomalies or changes in data and triggering alerts, according to certain embodiments.

The present disclosure describes systems and methods for creating an alert mechanism. More specifically, the alert mechanism is created by setting up an alert definition that includes a set of rules. An interactive, real-time preview of the alert definition is provided, where the number, frequency, and recency of alerts is forecasted and presented to a user per rule and across the alert definition. Thus, knowledge about how each rule contributes to the triggering of alerts and about the overall amount of alerts is available to the user. Adjustments to the alert definition can then be made to hone in on exact alert criteria that will provide the best user experience and avoid or significantly reduce the likelihood of alert fatigue. Thereafter, the alert definition can be saved and used to analyze data and, accordingly, generate and send alerts.

Existing systems deploy an alert mechanism based on a trial and error basis at the risk of alert fatigue and computational inefficiencies. In contrast, the interactive, real-time preview of the alert definition minimizes, if not avoids altogether, the alert fatigue and computational inefficiencies. Because the overall performance of the alert definition and the individual contribution of each rule to this performance is previewed, proper adjustments to the alert definition are available. These adjustments are possible prior to actual usage of the alert definition and refine the triggering of alerts such that only the optimal amount of alerts is generated and communicated over time.

In an embodiment, a user interface is available at a computing device of the user. The user interface includes a number of fields for specifying an alert definition, for previewing the performance of the alert definition, and for saving the alert definition. The performance of the alert definition can be expressed in different ways. One example of the performance is the total number of alerts that should be triggered within a time period. Another example of the performance is a distribution of the alerts over the time period (e.g., their timing). Yet another example of the performance is the frequency of the alerts (e.g., how often an alert is triggered). A further example of the performance is recency of the alerts (e.g., how recent an alert is relative to the length of the time period). To specify the alert definition, the fields of the user interface enable the user to define parameters of each rule and logic to aggregate the alerts across the different rules (e.g., Boolean logic). For each rule, the user identifies, via the user interface's fields, the desired set of observations (e.g., the raw data or measurable metrics of the data that should be analyzed, such as page view), one or more alert trigger criteria (e.g., a threshold that, if exceeded, would trigger an alert), one or more filters applicable to the set of observations, and/or other parameters of the rule. The alert definition is formed as a collection of the rules and aggregation logic. A back-end system receives the alert definition from the user's computing device and responds in real-time or near real-time (e.g., within seconds of the receipt) with a preview of the alert definition's performance and the contribution of each rule to this performance (e.g., the total number of alerts that each rule generates). The performance and the contribution of each rule are then previewed in the user interface. If any adjustments are needed, the user updates the alert definition (e.g., any of the rule parameters or aggregation logic) via the user interface. Once finalized, the user can click on a save option in the user interface, thereby saving the final alert definition for subsequent usage.

The back-end system has access to different sources that collect and store various types of data corresponding to the specified sets of observations. The back-end system also includes logic for analyzing the data based on the specific parameters of each rule and logic for aggregating the results across the different rules based on the aggregation logic. Upon receiving the alert definition, the back-end system parses the alert definition to identify each rule, the rule parameters, and the aggregation logic. For each rule, the back-end system then accesses historical data that corresponds to the respective set of observations, filters the historical data as applicable, and applies specific analysis logic given the one or more alert trigger criteria. Accordingly and for each rule, the back-end system detects trigger points over a time period based on processing of the historical data according to the rule. A trigger point represents a point in time that falls within the time period and that corresponds to an alert that would be triggered at that point in time given a rule. The set of trigger points of a rule represents the contribution of the rule to the performance of the alert definition. Once detected for all the rules of the alert definition, the back-end system aggregates the trigger points according to the aggregation logic to compute the performance of the alert definition. The individual contributions of the rules and the performance of the alert definition are sent to the user's computing device.

In an embodiment, to improve the computational efficiency and the responsiveness of the user interface, caching is implemented. For example, user's computing device caches the individual contributions and the performance. If an adjustment is made to the alert definition, the back-end system re-runs the data processing for only the rule(s) impacted by the adjustment and returns the relevant updated individual contribution(s). Thereafter, the computing device updates the performance given the existing cache and the received updates. The caching significantly reduces the computational cycles associated with previewing the performance. For instance, if the alert definition includes ten rules, and an adjustment is made to one rule, only one individual contribution is re-computed, as opposed to ten, thereby providing a ninety percent computational savings.

Hence, by using the alert mechanism of the present disclosure, a real-time and interactive preview of the performance of an alert definition becomes possible. The preview relies on specific parameters of the alert definition and historical data. The preview can also be granular by presenting the individual contribution of each rule to the overall performance of the alert definition, thereby enabling the identification of the most contributing rule(s). Further, the preview leverages caching to provide a fast, responsive experience. Based on the preview, a user can adjust the trigger sensitivity levels to see how the adjustment changes the performance. Once a desirable performance is achieved, the user can then save and share the alert with other users.

In a further embodiment, many different alert definitions can be created and applied to the same user. Similar analysis as above is possible, where the performance per alert definition and contribution per rule are computed. The different performances can be aggregated to generate an overall performance for the user. The overall performance is previewed and represents the total amount of alerts that the user would be subjected to given the different alert definitions.

The preview can include multiple granularity levels. At the highest level, the overall performance is presented. At a next level, the performance of each alert definition is presented. At the lowest level, the contribution of each rule is presented.

As used herein, the term "alert definition" represents a logical definition for detecting an anomaly and/or a change in data and triggering an alert given the detection. The alert definition is specified according to a set of rules. The set of rules can be specified or selected by a user via a user interface.

As used herein, the term "rule" represents a set of analysis parameters for analyzing and detecting an anomaly and/or a change in data. The analysis parameters include one or more of a set of observations, an alert trigger criterion, and a filter. The term "set of observations" represents a set of data that is observable and measurable, such as page views, click stream, or other measurable metrics. The term "alert trigger criterion" represents an analysis criterion, such as a predefined or dynamic threshold, for detecting the anomaly and/or change such that, when detected, an alert can be triggered.

As used herein, the term "trigger point" represents a point in time that falls within a time period and that corresponds to an alert that would be triggered at that point in time given an analysis of data according to a rule.

As used herein, the term "performance of an alert definition" represents one or more of the total number of alerts that should be triggered within a time period, a distribution of the alerts over the time period, the frequency of the alerts, and/or recency of the alerts. The "contribution of a rule to a performance of an alert definition" represents an apportionment of the performance to the rule.

As used herein, the term "alert preview" represents a preview of alerts that should be triggered given an analysis of data according to an alert definition. The preview can be interactive, in real-time, and at different granularity levels and can present the performance per alert definition and the contribution per rule to the performance.

Referring now to the drawings, FIG. 1 illustrates an example of a computing environment in which an analytical system 100 is used for detecting anomalies or changes in data and triggering alerts, according to certain embodiments. The computing environment includes the analytical system 100 (which can be included in or otherwise used by a marketing apparatus), one or more computing devices 110, and one or more online services 112. The analytical system 100, computing devices 110, and online services 112 are communicatively coupled via one or more data networks 114 (e.g., the Internet, one or more local area networks, one or more wide area networks, or some combination thereof).

Each of the computing devices 110 is connected (or otherwise communicatively coupled) to a marketing apparatus (or the analytical system 100) via a data network 114. A user of one of the computing devices 110 uses various products, applications, or services supported by the marketing apparatus via the network 114. Examples of the users include, but are not limited to, marketing professionals who use digital tools to generate, edit, track, or manage online content, or to manage online marketing process, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

Digital tools, as described herein, include a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the analytical system 100.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

The analytical system 100 includes one or more devices that provide and execute one or more engines for providing one or more digital experiences to the user. The analytical system 100 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like.

The analytical system 100 also includes a data storage unit 109. The data storage unit 109 can be implemented as one or more databases or one or more data servers. The data storage unit 109 includes data that is used by the engines of the analytical system 100.

In some embodiments, the analytical system 100 can be divided into two layers of engines. For example, Layer 1 includes core engines that provide workflows to the user and Layer 2 includes shared engines that are shared among the core engines. Any core engine can call any of the shared engines for execution of corresponding task. In additional or alternative embodiments, the analytical system 100 does not have layers, and each core engine can have an instance of the shared engines. In various embodiments, each core engine can access the data storage unit 109 directly or through the shared engines.

In some embodiments, the user of a computing device visits a webpage or an application store to explore applications supported by the analytical system 100. The analytical system 100 provides the applications as a software as a service ("SaaS"), or as a standalone application that can be installed on one or more of the computing device 110, or as a combination. The user creates an account with the analytical system 100 by providing user details and also by creating login details. In additional or alternative embodiments, the analytical system 100 can automatically create login details for the user in response to receipt of the user details. The user can also contact the entity offering the services of the analytical system 100 and can get the account created through the entity. The user details are received by a subscription engine 174 and stored as user data 176 in the data storage unit 109. In some embodiments, the user data 176 further includes account data 178, under which the user details are stored.

A user can opt for a subscription to one or more engines of the analytical system 100. Based on subscription details of the user, a user subscription profile 180 is generated by the subscription engine 174 and stored. The user subscription profile 180 is stored in the data storage unit 109 and indicates entitlement of the user to various products or services. The user subscription profile 180 also indicates type of subscription, e.g., premium subscription or regular subscription.

Each engine of the analytical system 100 also stores customer data 186 for the user in the data storage unit 109. The user or the entity represented by the user can have one or more customers, including potential customers, and hence, the one or more engines of the analytical system 100 store the customer data 186. The customer data 186 can be shared across these engines or can be specific to each engine. In some embodiments, the access data 184 is a part of the customer data 186. The access to the customer data 186 is controlled by an access control engine 188 which can be shared across the engines of the analytical system 100 or each engine can have one instance of the access control engine 188. The access control engine 188 determines whether the user has access to a particular customer data 186 based on the subscription of the user and access rights of the user.

A user of the analytical system 100 can enable tracking of the content while creating content or at any other point. Various methods of tracking can be used. For example, tracking code can be embedded into the content for tracking and sending tracked data to the analytical engine 102. The analytical engine 102 tracks the data and stores tracked data as metrics data 103 or other analytics data (all of which may be referred to as a set of observations). The analytical engine 102 tracks the data and performs meaningful processing of the metrics data 103 or other analytics data to provide various reports to the user. In addition, in some embodiments, the analytical engine 102 also acts as a shared engine and is accessible by other engines to obtain meaningful analysis on basis of which other engines can offer various functionalities to the user. In additional or alternative embodiments, each engine can have an instance of the analytical engine 102 which is customized according to need of that engine. In various embodiments, the analytical engine 102 is used for tracking one or more types of content, such as mobile applications, video, image, website, document, advertisements, etc. In some embodiments, the analytical engine 102 also supports predictive intelligence to provide predictions based on the set of observations (e.g., the metrics data 103 and/or other analytics data). In some embodiments, the analytical engine 102 also stitches information tracked from various sources where the content is consumed and provides a holistic view (e.g., a 360 degrees' view) of the metrics data 103 or other analytics data.

In some embodiments, the analytical system 100 also includes a content personalization engine 196. The content personalization engine 196 enables the user to provide different digital experiences to the customers when different customers visit the same webpage or the same application of the user. The content personalization engine 196 provides various workflows to the user to create different versions of the webpage or the application or the content and to perform AB testing. Based on the testing, the user may choose to provide different personalization for different sets of customers. The content personalization engine 196 also uses the customer data 186. The customer data 186 includes customer profiles. The customers, as described herein, also includes mere visitors which are not customers yet. A profile includes one or more attributes of a customer. An attribute, as described herein, is a concept using which the customer can be segmented. Examples of the attribute include, but are not limited to, geographical location, age, gender, purchase capacity, language, habits, browsing trends, or any other attribute using which the customers can be segmented.

The customer data 186, at least some of which may be included in the metrics data 103 or stored separately from the metrics data 103, is generated by a customer segmentation engine 197 by collecting data from different sources including electronic sources, such as the analytical engine 102, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

In various embodiments, the customer data 186 also includes data regarding devices used by the customers. The device data is used for stitching customer data. For example, a customer 1 may use device 1 to visit website A. The customer 1 may user device 2 to visit website B. The website A and the website B may belong to the same user. So, instead of considering customer 1 as two different customers the data including at least one common identifier such as email id helps the user to identify that the two different visits were made by the same customer 1. Also, by analyzing the customer data 186 and the metrics data 103 or other analytics data, richer customer profiles or segments can be generated. Also, devices that correspond to the same customer can be identified resulting in providing more targeted digital experience to the customer and making benefit for the user.

In some embodiments, the analytical engine 102 accesses a relevant metrics dataset 103 and executes suitable program code for detecting anomalies or changes in the metrics dataset 103 and, accordingly, generating alerts. The alerts are provided to the computing devices 110 over the data network 114. In an example, a computing device is operated by a user who is subscribed with the analytical system. The user's subscription profile 180 includes a set of alert definitions, each of which in turn includes a set of rules for analyzing the metrics dataset 103 and generating the alerts. Accordingly, the user's computing device 110 receives the alerts from the analytical engine 102 when anomalies and/or changes are detected given at least one alert definition and given that the user is subscribed to the alert definition.

In an example, the analytical engine 102 accesses the metrics dataset 103 that includes multiple segments. An example of a metrics dataset is a time series in which data items for a given metric are organized by a time period (e.g., number of page views per day over thirty days). An example of a segment is a time series in which portion of a metrics dataset is filtered based on a common feature with respect to computing devices or users of the computing devices involved in the data network activity.

Each data item in a segment has a first attribute having a metrics data value (e.g., "page views," "bounce rates,"

"website visits") and a second attribute indicating a feature of a computing device or a user of the computing device that accesses one or more online services via a data network (e.g., a geographic attribute of the computing device or the user, a demographic attribute of the user, a hardware attribute of the computing device, a software attribute of the computing device, etc.). In some embodiments, a common feature for a segment involves data items in the segment sharing a common value for the second attribute. In additional or alternative embodiments, a common feature for a segment involves data items in the segment sharing a common range of values for the second attribute.

For instance, the metrics dataset 103 depicted in FIG. 1 includes segments 104a-c, 106a-c, 108a-c. The segments 104a-c include metrics data describing a first metric (e.g., numbers of page views) for an online service. The segments 106a-c include metrics data describing a second metric (e.g., number of website visits) for an online service. The segments 108a-c include metrics data describing a third metric (e.g., bounce rates) for an online service. Each segment of metrics data is a subset of the metrics dataset 103 having a common feature with respect to a geographic location in which certain computing devices accessed one or more of the online service 112 (i.e., a common feature with respect to computing devices).

In some embodiments, the analytical engine 102 processes data received from one or more online services 112, data generated from interactions with one or more online services 112 by computing devices 110, or any other data associated with one or more online services 112. The various metrics datasets in the metrics dataset 103 are generated from interactions by the computing devices 110 with the online services 112. The online services 112 provide applications, data, and other functions that are accessed by one or more computing devices 110 via the Internet or one or more other suitable data networks 114. Examples of the online services 112 include (but are not limited to) social media websites, websites for purchasing products or services, etc.

The computing devices 110 execute respective user applications that are used to access the online services 112. In some embodiments, one or more of the computing devices executes include at least one application supported by the analytical system 100. Each application presents a user interface for interacting with the online services 112. Examples of the user applications include, but are not limited to, web browsers for accessing websites provided by the online services and applications specific to the online services. Examples of the computing devices 110 include, but are not limited to, a personal computer ("PC"), tablet computer, a desktop computer, a processing unit, any combination of these devices, or any other suitable device having one or more processors.

Figure 2:
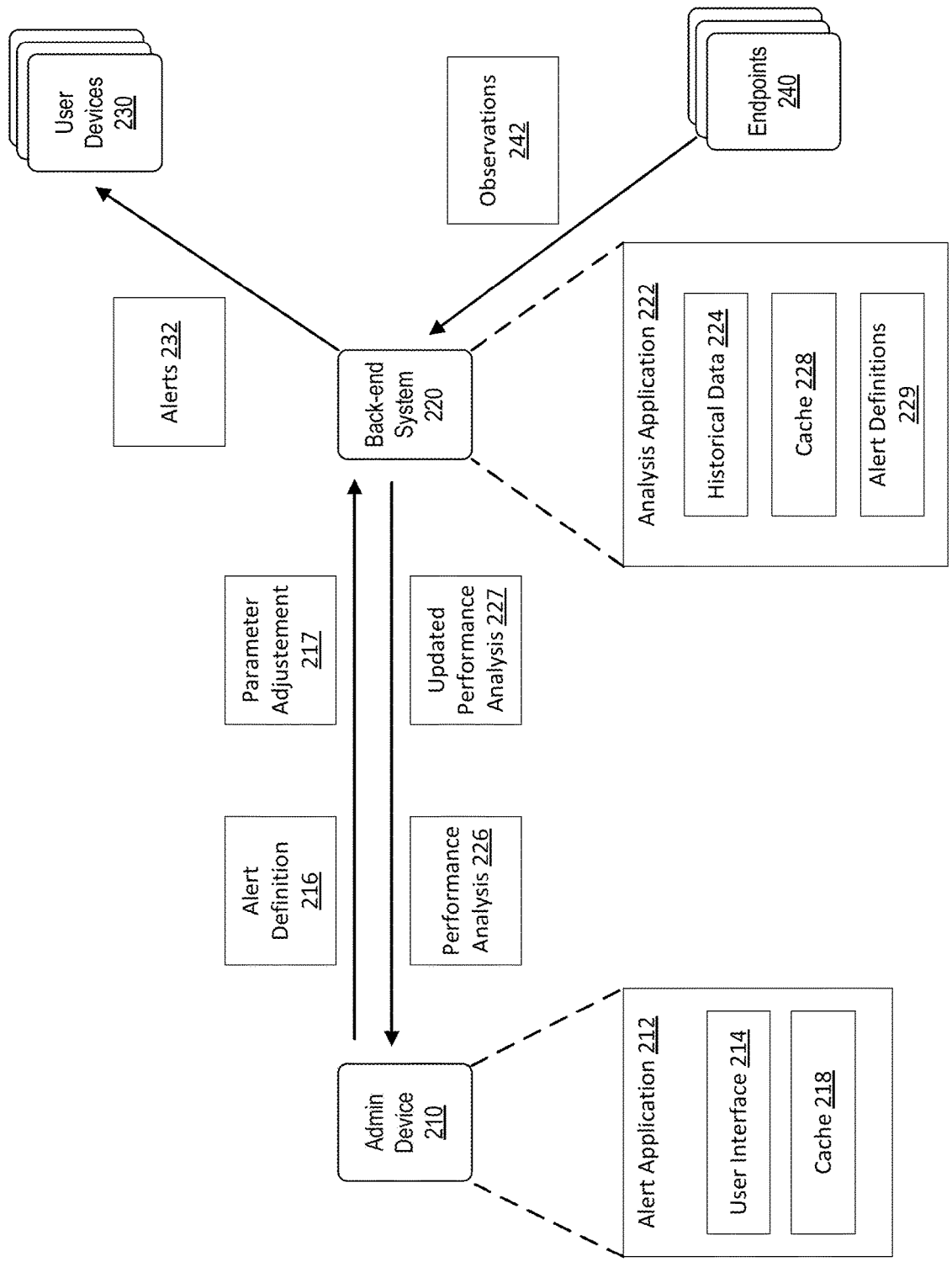
FIG. 2 illustrates an example of a computing architecture for detecting anomalies or changes in data and triggering alerts, according to certain embodiments.

FIG. 2 illustrates an example of a computing architecture for detecting anomalies or changes in data and triggering alerts, according to certain embodiments. The computing architecture includes an administrator device 210 and a back-end system 220, in communication over a data network (not shown). The administrator device 210 includes some or all of the components of a computing device 110 of FIG. 1. Similarly, the back-end system 220 includes some or all of the components of the analytics system 100 of FIG. 1. Generally, an administrator operates the administrator device 210 to create one or more alert definitions. In turn, the back-end system 220 receives the alert definition(s), analyzes relevant historical data, and responds with a preview of the performance of the alert definition(s) and individual contributions of the rules based on the analysis. Adjustments can be made to an alert definition or a specific rule via the administrator device 210. Once the alert definition is finalized, it is saved at the back-end system 220. Thereafter, observations 242 are collected from various endpoints 240 and alerts 232 are triggered and sent to user devices 230 given the stored alert definitions.

In an embodiment, the administrator device 210 hosts an alert application 212. The alert application 212 presents a user interface 214. A detailed example of the user interface 214 is further described in FIG. 3. Generally, the user interface 214 includes multiple fields. Certain fields enable the administrator to specify parameters of the alert definition (e.g., to select or define the rules) and logic for aggregating the alerts across the rules of the alert definitions. Other fields present a preview of the performance of the alert definition and the contribution of each rule to the performance. The alert application 212 receives the user input of the administrator via the user interface 214, where the user input specifies the parameters and aggregation logic. The alert application generates an alert definition 216 based on the user input. The alert definition 216 is sent from the administrator device to the back-end system 220.

The back-end system 220 hosts an analysis application 222. The analysis application 222 parses the alert definition 216 to identify the rules, the rule parameters, and the aggregation logic. The rule parameters include sets of observations, alert trigger criteria, and filters. The analysis application 222 accesses the relevant historical data 224 that corresponds to the identified sets of observation. (e.g., relevant past observations that have been collected). For each rule, the analysis application 222 selects and applies an analysis logic (e.g., a statistical analysis, a time-series analysis, a regression analysis, a clustering analysis, a machine learning algorithm, etc.) to the historical data 224 given the alert trigger criteria. For example, one rule specifies that an alert should be triggered anytime the number of page views within a time frame exceeds a threshold. Accordingly, the analysis application 222 sums the number and compares it to the threshold. In comparison, another rule specifies that an alert should be triggered anytime a bounce rate deviates from the mean bounce rate by a certain percentage. For this rule, the analysis application 222 computes the mean and compares the bounce rate thereto. By analyzing each rule, the individual contributions of the different rules are measured. Given the aggregation logic, the analysis application 222 computes the overall performance of the alert definition 216 by properly aggregating the individual contributions. The analysis application 222 generates a performance analysis 226 that includes the performance of the alert definition and the individual contributions of the rules to the performance. The performance analysis 226 is sent to the administrator device 210 and is previewed in the user interface 214.

In an example, the performance analysis 226 represents a forecasted performance and individual contributions. More specifically, the historical data 224 is analyzed to forecast the number, frequency, distribution, and/or recency of alerts within a future time period. In another example, no forecast is provided. Instead, the performance analysis 226 represents the actual number, frequency, distribution, and/or recency that would have been experienced had the alert definition 216 been in place in a past period of time.

Based on the preview of the performance analysis 226 in the user interface 214 or over time, the administrator may adjust one or more parameters of the alert definition 216. Accordingly, a parameter adjustment 217 is sent to the back-end server 220. In turn, the analysis application 222 updates the performance analysis 226. Accordingly, an updated performance analysis 227 is provided to the administrator device 210 for presentation in the user interface 214.

In an example, caching is performed to increase the computational efficiency and responsiveness associated with providing the updated performance analysis 227. The caching can be local to the administrator device 210, the back-end server 220, or distributed between the two. For instance, upon receipt of the original performance analysis 226, the administrator device 210 caches 218 the performance of the alert definition 216 and the individual contributions of the rules. Alternatively or additionally, back end system caches 228 this data. Based on the parameter adjustment 217, the alert application and/or analysis application 222 identify the impacted rules for which the individual contributions should be updated (or, in the more simple example, if the rules stay the same, but the aggregation logic is updated). Accordingly, the analysis application 222 re-computes particular contributions, but the remaining ones are not (e.g., individual contributions of the rules that are not impacted). Depending on how the caching is implemented, the analysis application 222 generates the updated performance analysis 227 given its cache 228 and the re-computed contributions and/or provides the re-computed contributions to the alert application 212, which then generates the updated performance analysis 227 in light of its cache 218 instead.

Once the administrator is satisfied with the alert definition 216, user input is provided at the user interface 214 to save the alert definition 216. The administrator can also identify, via the user interface 214, users that should be subscribed to the alert definition 216. A user can be identified using a user name, an account identifier, and email address, a mobile number, or other identifiers. Accordingly, the back-end system 220 stores this and other alert definitions 229 and the associations with the users for subsequent use.

In an example, the endpoints 240 represent collection servers that are distributed within a network and that collect various types of observations 242, such as the metric data-sets 103 of FIG. 1. Over time, the analysis application 222 analyzes the observation 242 according to the alert definitions 229 to trigger alerts 232. The alerts 232 are sent to the proper user devices 230 given the associations between the alert definitions 229 and the user identifiers.

Figure 3:
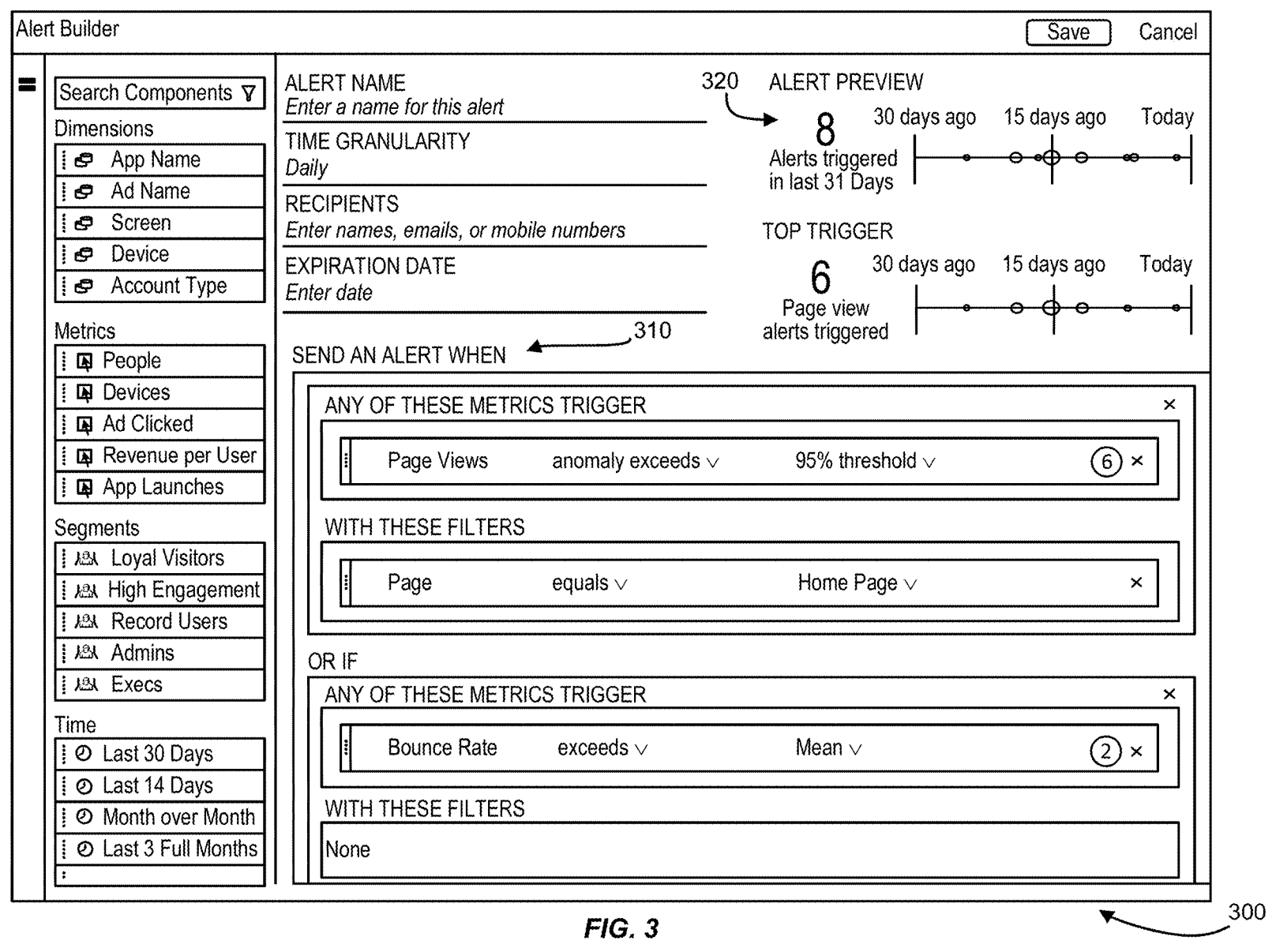

FIG. 3 illustrates an example of a user interface 300 for specifying an alert definition and presenting a preview of the alert definition's performance, according to certain embodiments. Generally, the user interface includes an alert definition field 310 and a preview field 320, among other fields. The alert definition field 310 enables user input to define the parameters of the rules and the aggregation logic that form the alert definition. The preview field 320 presents a preview of the performance of the alert definition, such as the total number, distribution, frequency, and/or recency of alerts over a time period.

As illustrated, a user, such as an operator, inputs a name for the alert definition, identifies a time granularity (e.g., alerts to be generated on a daily, weekly, monthly or other time-based basis), identifies recipient users, and sets an expiration date for the alert definition. Under the alert definition field 310, the user inputs parameters of each rule and the aggregation logic (e.g., Boolean operations). For instance, the alert definition field 310 presents each rule in a rule field. Each rule field in turn includes a number of input fields for receiving the user input that specifies the parameters of the rule. One input field is an observation field for identifying the set(s) of observation of interest. Another input field is an alert trigger criterion field for identifying an alert trigger criterion. Yet another input field is a filter field for identifying a filter applicable to the set(s) of observations. In addition to presenting fields for defining parameters of a rule, the rule field also presents a preview of the contribution of the rule to the performance of the alert definition, such as any of the total number, distribution, frequency, and/or recency of alerts that the rule would generate over a period of time. In this way, the user is able of previewing the overall performance under the preview field 320 and the individual contributions next to each of the rules.

In addition, the user interface 300 can present shortcuts for specifying parameter of the alert definition or the rules. For example, the shortcuts include selectable dimensions, metrics, segments, and/or time period that define one or more available sets of observations.

FIG. 3 illustrates a particular example of an alert definition that includes two rules and an "OR" Boolean logic. Of course, other alert definitions are possible. The rules of the alert definitions can be selected from a list of available rules, defined given a predefined set of fields, or entered in free form. As illustrated, the rules are set to trigger alerts on a daily basis. The first rule specifies that an alert should be triggered when the number of page views per day for a web site indicates an anomaly that exceeds a ninety-five percent threshold (e.g., the page view number is less than ninety-five percent or greater than a hundred and five percent of the average number of page views). The first rule also filters the page views to visits to only the home page of the web site. The second rule identifies that an alert should be triggered when the bounce rate exceeds the average daily bounce rate but does not apply any filters. According to this alert definition, an alert would be triggered if the number of page views per day for the home page indicates an anomaly that exceeds a ninety-five percent threshold or if the bounce rate from any page of the web site exceeds the average daily bounce rate. The alert preview field 320 indicates that, over the last thirty-one days, eight alerts would have been triggered and that the top trigger would have been the first rule. Of course, a similar preview can be made for a forecast of the next 31 days. In addition, within the rule field of each rule, the number of alerts that the rule would trigger is previewed (e.g., the first rule would trigger six alerts whereas the second rule would trigger two alerts).

In an embodiment, a similar user interface is possible to present an overall performance for a user across multiple alert definitions to which the user is subscribed. For instance, instead of presenting rules under the alert definition field 310, the various alert definitions and their individual performances are presented. Similarly, instead of presenting the performance of a single alert definition in the preview field 320, the overall performance across the different alert definitions is presented. In addition, each of the alert definitions can be linked to a corresponding analysis page, similar to what is presented in the user interface 300. Upon clicking an alert definition, the respective analysis is presented and provides the details of the alert definition's performance, rule parameters, and individual contributions of the rules.

Turning to FIGS. 4-7, the figures illustrate example flows for previewing the performance of an alert definition. For each of the illustrative flows, an application is illustrated as performing the respective operations. The application can be hosted on a user device, such as the administrator device 210 of FIG. 2 or the computing device 110 of FIG. 1. The application can additionally or alternatively be hosted on a computer system, such as the back-end system 220 of FIG.

2 or the analytics system 100 of FIG. 1. Further, instructions for performing the operations can be stored as computer-readable instructions on a non-transitory computer-readable medium. As stored, the instructions represent programmable modules that include code or data executable by a processor of the computing device and/or the computer system. The execution configure the computing device and/or computer system to perform the specific operations. Each module in combination with the processor represent a means for performing a respective operation(s). While the operations are illustrated in a particular order, it should be understood that no particular order is necessary and that one or more operations may be omitted, skipped, and/or reordered.

Figure 4:
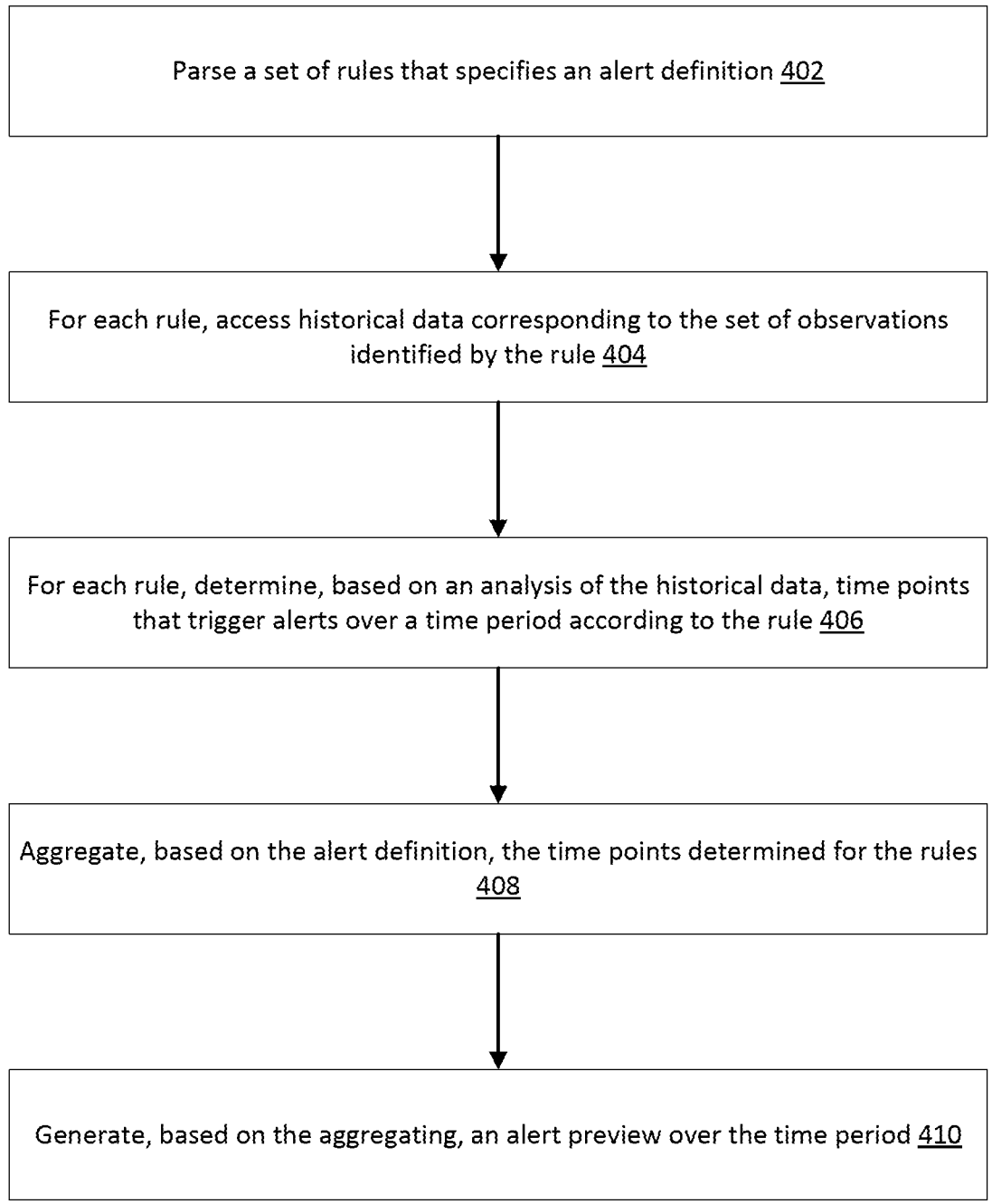
FIG. 4 illustrates an example of a flow for previewing the performance of an alert definition, according to certain embodiments.

FIG. 4 illustrates an example of a flow for previewing the performance of an alert definition, according to certain embodiments. Some of the operations of the flow include sub-operations further illustrated in FIGS. 5-7. Generally, the flow enables a preview of the number, distribution, frequency, and/or recency within a time period for the alert definition and per rule of the alert definition.

The flow of FIG. 4 starts at operation 402, where the application parses a set of rules that specifies an alert definition. Generally, the alert definition is defined based on user input in a user interface associated with the application. The application uses the alert definition to detect one or more of anomalies and/or changes in data and, accordingly, trigger alerts. In an example, the alert definition is formed of a plurality of rules and an aggregation logic to add the contribution of each rule. In turn, each rule includes a number of rule parameters, such as one identifying a set of observation, an alert trigger criterion, and a filter. The aggregation logic includes, for instance, logic for one or more Boolean operation(s). The rule parameters and the aggregation logic are defined based on the user input in the user interface.

At operation 404, the application accesses, for each rule of the alert definition, historical data corresponding to the set of observations identified by the rule. In an example, the rule identifies a set of observations that is of interest, such as page views. The user input in the user interface also defines a time period of interest (e.g., alerts on a daily, weekly, monthly, or some other time-based interval). The historical data includes observations that are of interest (e.g., page views) and that have been collected and stored in a past time period by, for example, endpoints within a network. Generally, the past time period has a length greater than the length of the time period of interest such that the amount of historical data has sufficient statistical significance. For instance, if the time period of interest is a single day, the past time period can be a week.

At operation 406, the application determines, for each rule of the alert definition and based on an analysis of the historical data accessed for the rule, time points that trigger alerts over the time period according to the rule. Different types of analysis are possible including, for example, statistical analysis, time-series analysis, regression analysis, clustering analysis, and/or machine learning algorithm. Generally, the analysis detects one or more of anomalies or changes in the historical data. The application selects the proper analysis according to a number of factors. One factor relates to whether the time period of interest is forward looking or a backward looking time period. If forward looking, the preview of the alerts represents a forecast of the performance of the alert definition. If backward looking, the preview of the alerts represents an actual performance that would have been observed had the alert definition been in place. Another factor relates to the rule parameters themselves. The type of the observations of interest, alert trigger criterion, and/or filtering can necessitate a particular type of analysis. For instance, if the rule specifies that an alert should be triggered anytime the number of page views within a time frame exceeds a threshold, the analysis would include a summation of the number and a comparison to the threshold. The application applies the selected analysis to the historical data to identify each time point within the time period of interest that would trigger an alert. The application also stores properties of the time point, such as its timing, the reason for the triggering of the alert, and the association with the rule.

At operation 408, the application aggregates, based on the alert definition, the time points determined for the rules of the alert definition. In an example, this aggregation is subject to the aggregation logic specified in the alert definition. Accordingly, the application determines the total number, distribution, frequency, and/or recency of time points within the time period of interest for the alert definition. The properties of these time points can also be stored. Because each time point represent a point in time that would trigger an alert, the total number, distribution, frequency, and/or recency of the time points and the alerts within the time period are equivalent.

At operation 410, the application generates, based on the aggregating, an alert preview over the time period for presentation at the user interface in response to the user input. The alert preview presents a performance of the alert definition and the contribution of each rule to the performance. For example, the preview alert presents the total number and distribution of all the alerts for the alert definition over the time period of interest. The preview alerts also presents, for each rule, the total number of the alerts for the rule over the time period, where this total number is triggered at least because of the rule.

Figure 5:
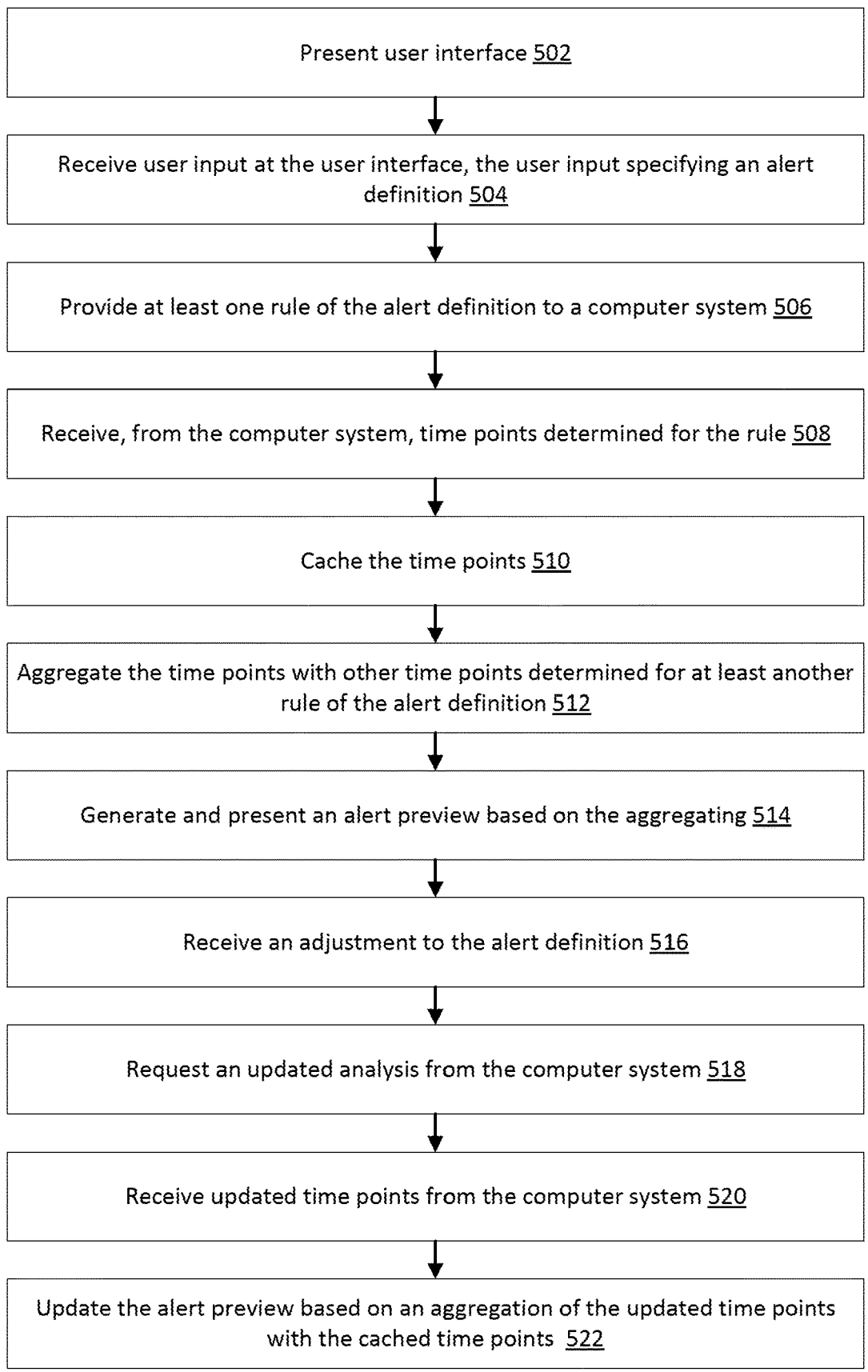
FIG. 5 illustrates an example of a flow for creating and adjusting an alert definition, according to certain embodiments.

FIG. 5 illustrates an example of a flow for creating and adjusting an alert definition, according to certain embodiments. In an example, the flow of FIG. 5 is implemented on a user device, such as the administrator device 210 or computing device 110 of FIG. 1. The user device is in communication with a computer system, such as the back-end system 220 of FIG. 2 or the analytics system 100 of FIG. 1.

The flow of FIG. 5 starts at operation 502, where the application presents a user interface at the user device. The user interface includes multiple fields for creating an alert definition and previewing the performance thereof, such as alert definition field and a preview field.

At operation 504, the application receives user input at the user interface. The user input specifies the alert definition. For example, a user operates the user device and inputs different parameters of the alert definition in the user interface. The parameters define rules of the alert definitions and aggregation logic.

At operation 506, the application provides at least a rule of the alert definition to the computer system. In an example, the alert definition is new and has not been previously previewed. In this example, the different rules and aggregation logic are sent to the computer system.

At operation 508, the application receives, from the computer system, time points. The time points represent alerts that would be triggered by the rule over a time period of interest. In an example, different sets of time points are received. Each set is specific to one of the rules of the alert definition. The computer system (or an application hosted thereon), determines the time periods based on an analysis of historical data according to the rules, as described in connection with FIGS. 4 and 6.

At operation 510, the application caches the time period. This operation can improve the computational efficiency and responsiveness of updating the alert definition and the preview of the performance. In an example, the time points and their associations to the rules of the alert definition are stored in a local cache of the application or local storage of the user device.

At operation 512, the application aggregates the time points determined for the rule with other time points determined for another rule of the rule set. The other time points may have been received at operation 508 or may be able from cache and represent alerts that would be triggered by the other rule within the same time period of interest. The application aggregates the two sets of time points (e.g., the cached time points, or otherwise) according to the aggregation logic of the alert definition. This operation can be repeated to aggregate the time points across all the different rules of the alert definition.

At operation 514, the application generates and presents an alert preview based on the aggregating. In an example, the alert preview is presented in the user interface. For instance, the preview field presents the total number, distribution, frequency, and/or recency of all alerts for the alert definition. In addition, total number, distribution, frequency, and/or recency of all alerts per rule can be presented next to each rule under the alert definition field.

Any or all of operations 510-514 need not be performed at the user device, depending on the distribution of operations between the user device and the computer system. For instance, some or all of these operations can be pushed to the computer system and the user device would receive the outcome back from the computer system.

At operation 516, the application receives an adjustment to the alert definition. For example, the user updates any of the rule parameters or aggregation logic of the alert definition, adds or removes a rule, changes the time period of interest, or inputs other adjustments to the alert definition via the user interface.

At operation 518, the application requests an updated analysis of the performance of the alert definition from the computer system based on the adjustment. In one example, the application identifies the adjustment to the computer system. In response, the application receives updated time points or an updated preview. In this example, different types of responses from the computer system are possible depending on how caching is implemented. If the user device caches time points, the response includes the updated time points. More specifically, the computer system determines the rule(s) impacted by the adjustment, re-computes time points for the impacted rule(s), and sends only these updated time points to the user device. If no caching is implemented at the user device, the response includes instead the updated preview, such as the updated performance of the alert definition and contributions of the rules.

At operation 520, the application receives the updated time points from the computer system. This operation assumes that caching is implemented at the user device. At operation 522, the application updates the alert preview based on an aggregation of the updated time points with the cached time points. This operation also assumes that caching is implemented at the user device. In an example, the updated time points are associated with the rule(s) impacted by the adjustment. Cached time points are also available to the application and are associated with the rules. The application identifies cached time points that are now stale and should be deleted because of the adjustment. The remaining cached time points are aggregated with the updated time points based on the aggregation rule of the alert definition.

Figure 6:
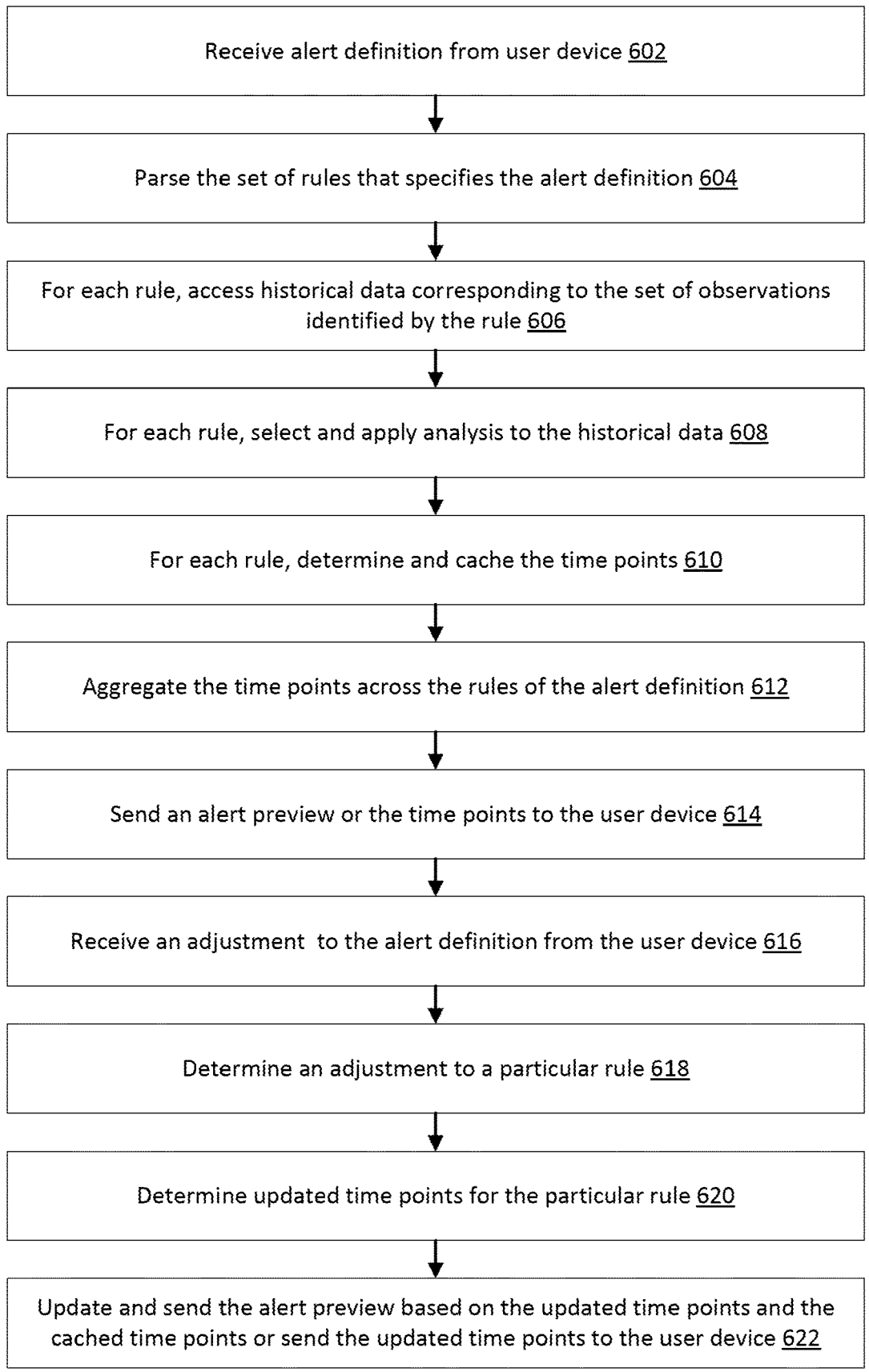
FIG. 6 illustrates an example of a flow for receiving an alert definition and previewing the performance thereof, according to certain embodiments.

FIG. 6 illustrates an example of a flow for receiving an alert definition and previewing the performance thereof, according to certain embodiments. In an example, the flow of FIG. 6 is implemented on a computer system, such as the back-end system 220 of FIG. 2 or the analytics system 100 of FIG. 1. The computer system is in communication with a user device, such as the administrator device 210 or computing device 110 of FIG. 1.

The flow of FIG. 6 starts at operation 602, where the application receives the alert definition from the user device. At operation 604, the application parses the set of rules that specifies the alert definition. The application identifies the rules, rule parameters, time period of interest, and aggregation logic based on the parsing. In an example, the rules, rule parameters, time period of interest, and aggregation logic are inputted in structured fields of a user interface hosted on the user device. In this example, the alert definition is received as a structured document and the parsing includes traversing the structured document to identify the rules, rule parameters, time period of interest, and aggregation logic.

At operation 606, the application accesses, for each rule, historical data corresponding to the set of observations identified from the rule. In an example, the historical data is collected by endpoints and sent to the computer system.

At operation 608, the application selects and applies, for each rule, an analysis to the corresponding historical data to identify the time points associated with the rule. In an example, the selection of the analysis for a rule depends on a number of factors including the parameters of the rule (e.g., a trigger criterion for a rule) and whether the time period of interest is forward looking or a backward looking time period.

At operation 610, the application determines and caches, for each rule, the time points. The time points for a rule are determined based on application of the proper analysis to the historical data corresponding to that rule. The time points are saved in local cache of the application or a local storage of the computer system. The caching allows the application to update the analysis of the alert definition without having to re-compute all of the time points.

At operation 612, the application aggregates the time points across the rules of the alert definition. The aggregation is performed according to the aggregation logic. At operation 614, the application sends an alert preview or the time points to the user device depending on the distribution of operations between the user device and the computer system. For instance, the alert preview is sent when no caching is implemented at the user device or when minimal operations are pushed onto the user device. The alert preview is based on the aggregation of the time points and includes any of the total number, distribution, frequency, and/or recency of alerts over the time period of interest for the alert definition and per rule. On the other, if the aggregation function is performed by the user device such that the user device generates the alert preview, the time points are sent instead.

At operation 616, the application receives an adjustment to the alert definition from the user device. The adjustment can be based on user input in the user interface hosted on the user device. At operation 618, the application determines an adjustment to a particular rule of the alert definition based on the adjustment to the rule definition. For example, the user input can specify an update to at least one of: the set of observations, the alert trigger criterion, or the filter identified by the particular rule.

At operation 620, the application determines updated time points for the particular rule based on the adjustment to the particular rule. For example, the application selects a new set of historical data and re-applies the analysis, selects and applies new analysis, or selects and applies a new filter to compute the updated time points.

At operation 622, the application updates and sends the alert preview based on the updated time points and the cached time point to the user device. For example, the application identifies cached time points that are now stale and should be deleted because of the adjustment.

The remaining cached time points are aggregated with the updated time points based on the aggregation rule of the alert definition. Additionally or alternatively, the application sends the updated time points to the user device. In this case, the user device can update the alert preview given its cache and the received, updated time points.

Figure 7:
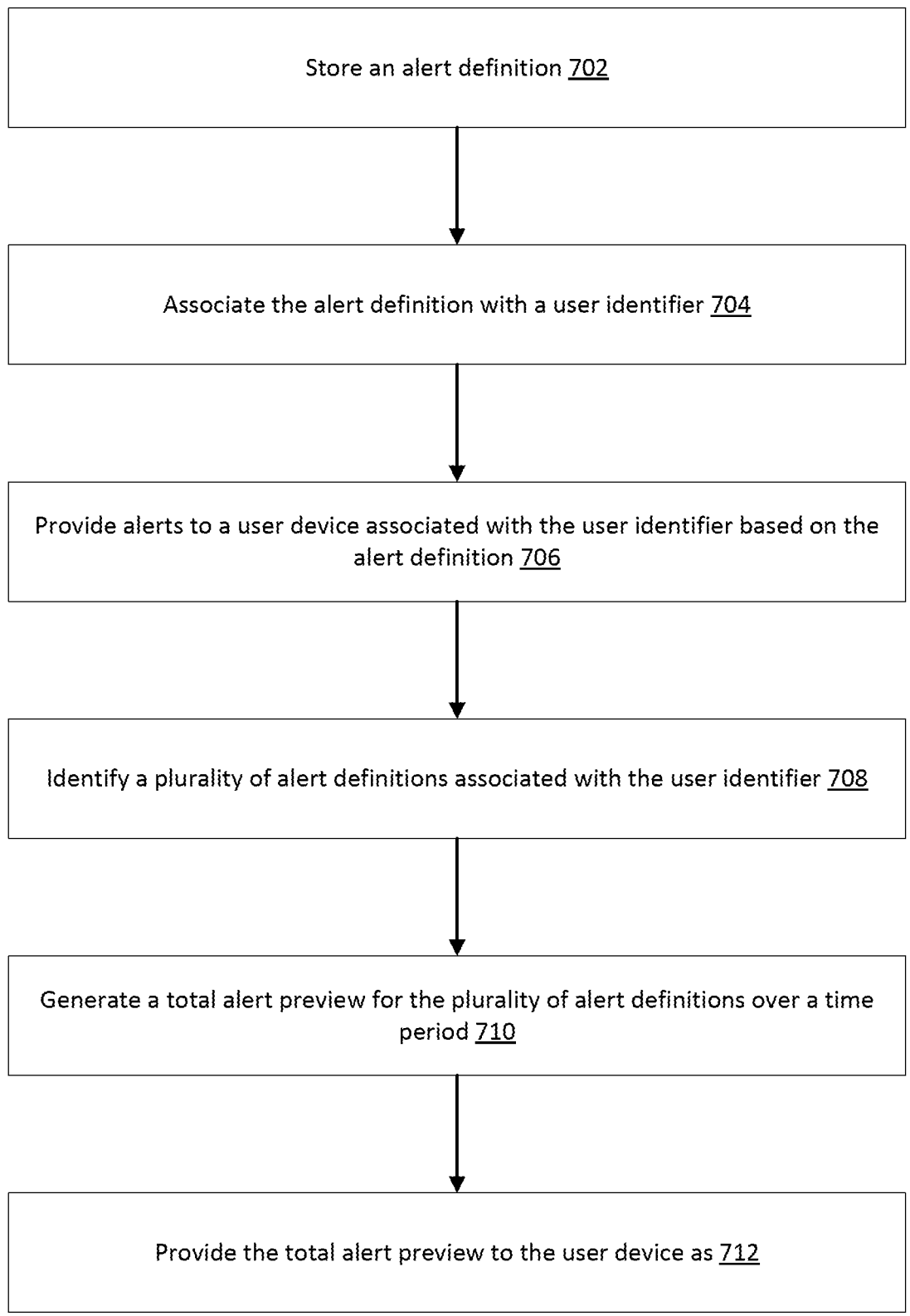
FIG. 7 illustrates an example of a flow for previewing the performance of multiple alert definitions associated with a same user identifier, according to certain embodiments.

FIG. 7 illustrates an example of a flow for previewing the performance of multiple alert definitions associated with a same user identifier, according to certain embodiments. More specifically, a user can directly or indirectly (e.g., via a request of an administrator) subscribe to more than one alert definitions. In this case, the user can receive alerts triggered from the different alert definitions. To avoid alert fatigue, a preview of the exposure to the various alerts across the different alert definitions can be generated and provided to the user or the administrator (e.g., to computing devices thereof). Adjustments to the alert definitions or the rules therein can be accordingly made.

The flow of FIG. 7 starts at operation 702, where the application stores an alert definition. At operation 704, the application associates the alert definition with a user identifier. In an example, the user identifier includes a user name, an account identifier, and email address, a mobile number, or some other identifier unique to the user. The user identifier can be provided as part of the user input that defines the alert definition or as part of a user request to save the alert definition. The application stores the association between the alert definition and the user identifier. For instance, the application updates a database or a list that associates a unique identifier of the alert definition (e.g., a name, a title, a serial number) with the user identifier. The alert definition can also be associated with multiple user identifiers.

At operation 706, the application provides alerts to a user device associated with the user identifier based on the alert definition. Once the alert definition is stored, the application monitors actual observations corresponding to the ones identified by the rules of the alert definition. The monitoring includes analyzing these observations according to the rules and to trigger the alerts.

At operation 708, the application identifies a plurality of alert definitions associated with the user identifier. For example, the alert definitions are identified from the database or list by looking up the user identifier.

At operation 710, the application generates a total alert preview for the plurality of alert definitions over a time period of interest. Similarly to the operations of FIGS. 4 and 6, the application analyzes each alert definition to compute its performance and the contribution of each rule thereof to the performance. Computing the performance includes generating the time points corresponding to the alerts. The application can associate each time point with the responsible rule and the responsible alert definition. The time points across the alert definitions can be aggregated to generate the total alert preview. In this case, the aggregation includes an "OR" Boolean logic (e.g., any time an alert would be triggered for a particular alert definition, the number of total alerts across all of the alert definitions is incremented by one). The total alert preview includes the total number, distribution, frequency, and/or alerts over the time period of interest across all the alert definitions, per alert definition, and per rule.

At operation 712, the application provides the total alert preview to the user device for presentation at the user interface. In an example, the user interface presents the total alert preview in a specific arrangement that allows the user to navigate between different granularity level. For example, a preview of the performance across all the alert definitions is presented along with a list of the alert definitions. Next to each alert definition in the list, a preview of the specific performance of the alert definition is presented. The listed alert definitions are linked to other preview pages or tabs (e.g. the total alert preview is linked to the alert previews of each of the alert definitions). By selection a particular alert definition, a preview of the performance of that alert definition is expanded and presented. This preview would further show the contributions of each rule of the alert definition.

Figure 8:
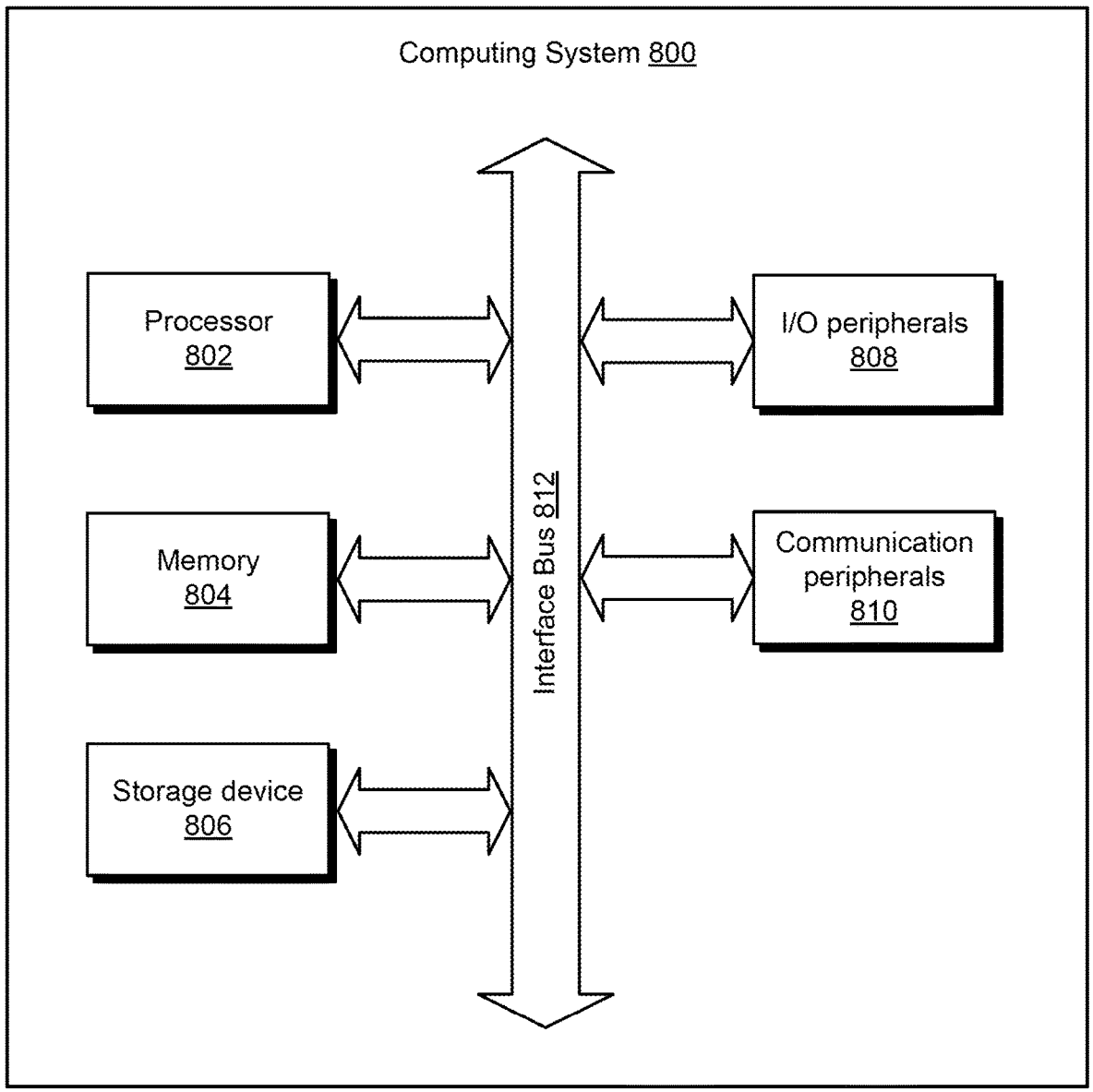
FIG. 8 illustrates examples of components of a computing system, according to certain embodiments.

FIG. 8 illustrates examples of components of a computing system 800, according to certain embodiments. The computing system 800 is an example of a user device or a computer system that is configured according to the functionalities described in connection with FIGS. 1-7. Although these components are illustrated as belonging to a same computing system 800, the computing system 800 can also be distributed.

The computing system 800 includes at least a processor 802, a memory 804, a storage device 806, input/output peripherals (I/O) 808, communication peripherals 810, and an interface bus 812. The interface bus 812 is configured to communicate, transmit, and transfer data, controls, and commands among the various components of the computing system 800. The memory 804 and the storage device 806 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 804 and the storage device 806 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computing system of, for example, a cloud network or a data center. The I/O peripherals 808 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 808 are connected to the processor 802 through any of the ports coupled to the interface bus 812. The communication peripherals 810 are configured to facilitate communication between the computing system 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms, such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for providing real-time and interactive previews of alerts to avoid alert fatigue in user interfaces, comprising, by a computer system:

parsing a set of rules that specifies an alert definition, wherein each rule identifies a set of observations and an alert trigger criterion based on user input in a user interface;

for each rule of the alert definition:

accessing historical observation data comprising a set of observation records, wherein each observation record identifies a respective observation of the set of observations identified by the rule, and determining, based on an analysis of the historical observation data, time points of the historical observation data that trigger alerts over a time period according to the rule, wherein the analysis of the historical observation data is based on the alert trigger criterion identified by the rule;

aggregating, based on the alert definition, the time points determined for the rules;
generating, based on the aggregating, a graphical representation of a timeline displaying an alert preview over the time period for presentation at the user interface in response to the user input, the graphical representation of the timeline comprising:
a first timeline portion displaying a total number and distribution of all alerts for the alert definition over the time period; and
a second timeline portion displaying a total number and distribution of the alerts for a particular rule of the set of rules over the time period; and
receiving, based on additional user input at the user interface, an adjusted rule comprising a modification to the particular rule, the adjusted rule comprising an adjusted alert trigger criterion different from an initial alert trigger criterion for the particular rule;
determining, based on the adjusted alert trigger criterion, updated time points that trigger alerts over the time period; and
generating an updated graphical display by modifying the first timeline portion and the second timeline portion of the timeline based on an aggregation of the updated time points.

2. The computer-implemented method of claim 1, wherein the computer system comprises a user device configured to present the user interface, and further comprising:
caching, by the user device, the time points determined for the rules, wherein modifying the first timeline portion and the second timeline portion of the timeline is further based on the cached time points.

3. The computer-implemented method of claim 1, wherein the modification to the particular rule further comprises an update to at least one of: the set of observations identified by the particular rule or a filter identified by the particular rule, and wherein the aggregation is based on a cache of the remaining time points.

4. The computer-implemented method of claim 1, further comprising, by the computer system:
storing and associating the alert definition with a user identifier based on a user request, wherein the user request comprises the user identifier and is received by the computer system based on the presentation of the alert preview; and
generating and sending subsequent alerts to a user device associated with the user identifier based on the alert definition being stored and associated with the user identifier.

5. The computer-implemented method of claim 1, further comprising, by the computer system:
storing and associating the alert definition with a user identifier;
identifying a plurality of alert definitions associated with the user identifier;
generating a total alert preview for the plurality of alert definitions over the time period, wherein the total alert preview presents a total number and distribution of all alerts across the plurality of alert definitions; and
providing, to a user device associated with the user identifier, the total alert preview generated for the plurality of alert definitions.

6. The computer-implemented method of claim 5, wherein the total alert preview generated for the plurality of alert definitions comprises a link to the alert preview generated for the alert definition.

7. The computer-implemented method of claim 1, wherein the user input further specifies a filter specific to a rule of the alert definition, and wherein time points corresponding to the rule are further determined by applying the filter to the historical observation data corresponding to the rule.

8. The computer-implemented method of claim 1, wherein the user input further specifies a length of the time period, and wherein the historical observation data corresponds to a past time period having a length greater than the length of the time period.

9. A computer system configured to provide real-time and interactive previews of alerts to avoid alert fatigue in user interfaces, the computer system comprising:
a processing device; and
a non-transitory computer-readable medium communicatively coupled to the processing device, wherein the processing device is configured to perform operations comprising:
parsing a set of rules that specifies an alert definition, wherein each rule identifies a set of observations and an alert trigger criterion based on user input in a user interface;
for each rule of the alert definition:
accessing historical observation data comprising a set of observation records, wherein each observation record identifies a respective observation of the set of observations identified by the rule, and
determining, based on an analysis of the historical observation data, time points of the historical observation data that trigger alerts over a time period according to the rule, wherein the analysis of the historical observation data is based on the alert trigger criterion identified by the rule;
aggregating, based on the alert definition, the time points determined for the rules;
generating, based on the aggregating, a graphical representation of a timeline displaying an alert preview over the time period for presentation at the user interface in response to the user input, the graphical representation of the timeline comprising:
a first timeline portion displaying a performance of the alert definition; and
a second timeline portion displaying a contribution of a particular rule of the set of rules to the performance of the alert definition;
receiving, based on additional user input at the user interface, an adjusted rule comprising a modification to the particular rule, the adjusted rule comprising an adjusted alert trigger criterion different from an initial alert trigger criterion for the particular rule;
determining, based on the adjusted alert trigger criterion, updated time points that trigger alerts over the time period; and
generating an updated graphical display by modifying the first timeline portion and the second timeline portion of the timeline based on an aggregation of the updated time points.

10. The computer system of claim 9, wherein the analysis of the historical observation data comprises a time-series analysis, and wherein the time-series analysis is selected based on the alert trigger criterion.

11. The computer system of claim 10, further comprising endpoints within a network, wherein the endpoints collect the historical observation data.

12. The computer system of claim 9, wherein the time points determined for the rules are aggregated according to a Boolean operation that is specified by the alert definition.

13. The computer system of claim 9, wherein the user interface comprises a preview field and an alert definition field, wherein the preview field presents a total number and distribution of all the alerts for the alert definition, and wherein the alert definition field presents each rule and a respective total number of alerts.

14. The computer system of claim 13, wherein the alert definition field comprises a plurality of rule fields, wherein each rule field corresponds to a rule from the set of rules and presents a plurality of input fields for specifying the rule, wherein the plurality of input fields comprise a set of observations field, an alert trigger criterion field, and a filter field.

15. The computer system of claim 14, wherein the alert definition field comprises a Boolean operation for aggregating the time points determined for the rule and the time points determined for another rule of the set of rules.

16. A non-transitory computer-readable storage medium storing instructions that, upon execution by a processor of a computing device, configure the computing device to perform operations to provide real-time and interactive previews of alerts to avoid alert fatigue in user interfaces, the operations comprising:
providing, to a computer system, a rule from a set of rules that specifies an alert definition, wherein the rule identifies a set of observations and an alert trigger criterion based on user input in a user interface of the computing device;
receiving, from the computer system, time points of the historical observation data determined for the rule, wherein the time points trigger alerts over a time period based on the rule, and wherein the time points are determined based on historical observation data comprising a set of observation records, wherein each observation record identifies a respective observation of the set of observations and the alert trigger criterion identified by the rule;
aggregating, based on the alert definition, the time points determined for the rule with time points determined for other rules from the set of rules;
generating, based on the aggregating, a graphical representation of a timeline comprising an alert preview displayed over the time period for presentation at the user interface in response to the user input;
presenting the graphical representation of the timeline comprising the alert preview at the user interface, wherein graphical representation of the timeline comprises:
a first timeline portion displaying a total number and distribution of all alerts for the alert definition; and
a second timeline portion displaying a total number and distribution of the alerts for the rule; and
receiving, from the computer system, an adjusted rule comprising a modification to the rule, the adjusted rule comprising an adjusted alert trigger criterion different from the alert trigger criterion;
determining, based on the adjusted alert trigger criterion, updated time points that trigger alerts over the time period; and
generating an updated graphical display by modifying the first timeline portion and the second timeline portion of the timeline based on an aggregation of the updated time points.

17. The non-transitory computer-readable storage medium of claim 16, wherein the time points are determined according to a time-series analysis of the historical observation data and represent detected anomalies or detected changes based on the alert trigger criterion.

18. The non-transitory computer-readable storage medium of claim 16, wherein the operations further comprise caching the time points received from the computer system, and wherein aggregating the time points determined for the rule with the time points determined for the other rules of the set of rules comprises aggregating cached time points.

19. The non-transitory computer-readable storage medium of claim 16, wherein the set of observations identified by the rule comprises page views of a web site, wherein the alert trigger criterion identified by the rule comprises a threshold value of page views, and wherein the alert preview identifies whether a total number of page views exceeds the threshold value.

\* \* \* \* \*